United States Patent [19]

Nichols et al.

[11] Patent Number: 5,602,732

[45] Date of Patent: Feb. 11, 1997

[54] FAULT TOLERANT DISPLACEMENT DETERMINATION METHOD

[75] Inventors: Gary A. Nichols, Farmington Hills; James D. Yegerlehner, South Lyon, both of Mich.

[73] Assignee: General Motors Corporation, Detroit, Mich.

[21] Appl. No.: 361,089

[22] Filed: Dec. 21, 1994

[51] Int. Cl.$^6$ .......................... B60K 41/04; G01M 15/00
[52] U.S. Cl. ........................ 364/424.034; 364/424.04; 364/551.01; 123/376; 123/399; 123/361; 73/118.1; 73/119 R
[58] Field of Search ................ 364/424.03, 424.04, 364/431.07, 551.01, 571.01, 579; 123/350, 352, 361, 363, 376, 377, 398, 399, 479, 494; 477/906; 74/513, 514, 542; 73/118.1, 119 R

[56] References Cited

U.S. PATENT DOCUMENTS

| | | | |
|---|---|---|---|
| 4,519,361 | 5/1985 | Murakami | 123/399 |
| 4,586,403 | 5/1986 | Lee et al. | 123/480 |
| 4,603,675 | 8/1986 | Junginger et al. | 123/478 |
| 4,718,272 | 1/1988 | Plapp | 73/118.1 |
| 4,920,939 | 5/1990 | Gale | 123/399 |
| 4,951,206 | 8/1990 | Kyohzuka | 364/424.1 |
| 4,993,383 | 2/1991 | Wokan et al. | 123/399.17 |
| 5,161,505 | 11/1992 | Bederna et al. | 123/399 |
| 5,167,212 | 12/1992 | Peter et al. | 123/399 |
| 5,255,653 | 10/1993 | Ironside et al. | 123/399 |
| 5,307,776 | 5/1994 | Unuvar et al. | 123/399 |
| 5,320,076 | 6/1994 | Reppich et al. | 123/399 |
| 5,445,126 | 8/1995 | Graves, Jr. | 123/399 |

*Primary Examiner*—Kevin J. Teska
*Assistant Examiner*—Tan Nguyen
*Attorney, Agent, or Firm*—Michael J. Bridges

[57] ABSTRACT

Resolution of redundant displacement sensor information to form a displacement value in an automotive electronic throttle control system provides for a varying contribution by each of a plurality of redundant sensors to the formation of the displacement value in accord with diagnosed variations in the fault status of the sensors. The number and type of fault conditions attributed to a specific sensor of the plurality over an analysis period are used to determine the relative degree by which that sensor will contribute to the displacement value formation. As an increasing number of fault conditions are attributed to a sensor, the relative degree of contribution of that sensor will gradually decrease. When severe fault conditions are attributed to a sensor, the relative degree of contribution of that sensor will rapidly decrease.

12 Claims, 6 Drawing Sheets

FAULT TOLERANT DISPLACEMENT DETERMINATION METHOD

FIELD OF THE INVENTION

This invention relates to automotive position sensing and, more particularly, to resolving redundant sensed position input signals.

BACKGROUND OF THE INVENTION

Position (displacement) transducers that communicate electrical signals indicating the position or displacement of a moving part, such as an automotive vehicle accelerator pedal or an engine inlet air valve are known. It is further known that redundant position indications output by multiple matched position transducers can be analyzed to improve position sensing robustness. It is still further known that a combination of at least three redundant position indications provided from at least three substantially independent position transducers may be used to improve position sensing robustness by not only determining when a position transducer is providing an inaccurate position indication, but by determining which transducer is providing the inaccurate position indication. If a majority of the at least three sensors indicate substantially the same position, any other sensors not in agreement will be assumed to be faulty and will be excluded, at least temporarily, from further use. The position indicated by the majority of sensors may then be combined or a single position indication from the majority used as a representation of the position of the measured part.

Part to part variations among position transducers of reasonable cost and among typical automotive electronics components dictate that some disagreement between position indications of the plurality of processed transducers values be tolerated. Marginal transducer performance is therefore forgiven and can be reduce the accuracy of the position representation. Even minor inaccuracies can perceptibly perturb automotive vehicle performance. Until the marginal transducer performance rises to a level no longer tolerated in such conventional approaches, such inaccuracies will persist.

Accordingly, it would be desirable to provide for redundant position or displacement sensing without tolerating marginal transducer performance while avoiding the cost associated with high precision position transducers and electronic components.

SUMMARY OF THE INVENTION

The redundant position sensing approach of the present invention applied to automotive vehicle position or displacement sensing applications provides is desirable in that a combination of redundant position indications from inexpensive position or displacement transducers are used to resolve the position or displacement of an automotive part and the contribution of any of the combination is reduced gradually in accord with its past and present fault status. Even minor fault conditions in any of the combination will be accounted for in the degree by which the transducers are permitted to contribute to the resolution of the automotive part position. Severe fault conditions attributed to a transducer may result in a more rapid decrease in its contribution to the position or displacement resolution.

More specifically, detailed fault condition information is maintained for each of a plurality of position transducers. Each of the plurality has associated with it a weight in the form of a multiplicitive coefficient the value of which is determined as a function of the detailed fault condition information. The magnitude of the weight associated with an individual transducer is inversely proportional to the severity of any fault condition corresponding to that sensor. A transducer having no diagnosed faults will have a large weight. A sensor having a number of fault conditions from substantially independent fault analyses may have a very small weight, which can be reduced to zero. A marginal transducer may have associated with it a weight of intermediate magnitude, etc.

In a further aspect of this invention, the plurality of sensors are diagnosed in a number of fault categories including, for example, a general magnitude correlation, a minimum value correlation, and an in range correlation category. The weight associated with a transducer will decrease gradually as it appears to have failed in a greater number of such categories. The weight associated with a transducer will decrease rapidly if a severe fault condition is diagnosed for the transducer, such as a fault condition commonly associated with a significant reduction in confidence that a transducer is even reasonably accurate.

BRIEF DESCRIPTION OF THE DRAWINGS

The invention may be best illustrated by reference to the preferred embodiment and to the drawings in which.

DESCRIPTION OF THE PREFERRED EMBODIMENT

Figure 1:
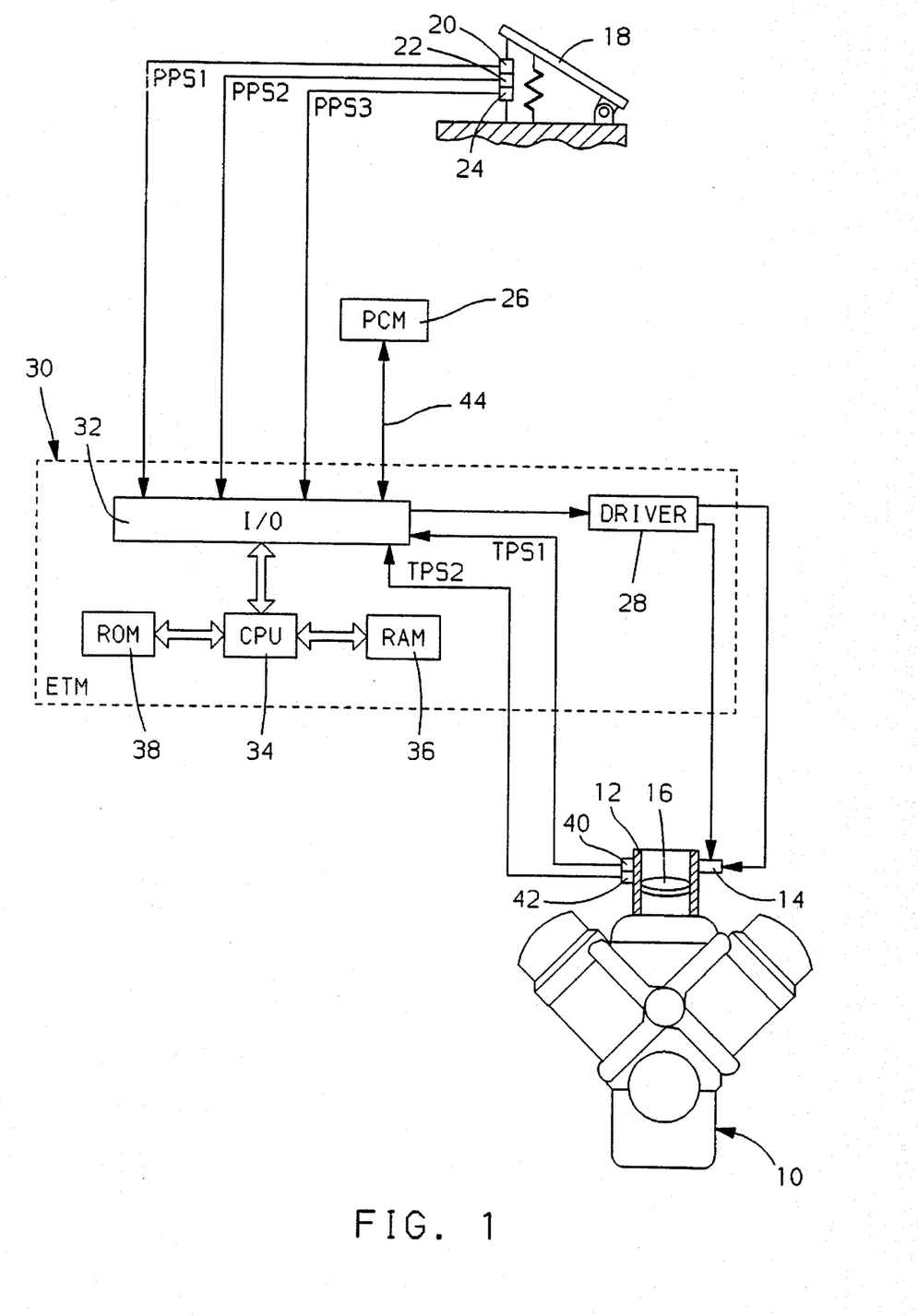
FIG. 1 is a general diagram of the automotive vehicle electronic throttle control system in which the preferred embodiment of this invention is incorporated.

Referring to FIG. 1, inlet air is metered to internal combustion engine 10 through positioning of inlet air valve 16, such as a conventional butterfly throttle valve in engine inlet bore 12. Actuator 14 is mechanically linked to the valve 16 to rotate therewith for valve positioning. The actuator 14 is a conventional brushed DC motor in this embodiment. The rotational position of the valve 16 is transduced by a pair of rotary potentiometers 40 and 42 which output signals TPS1 and TPS2 having a voltage magnitude indicating such rotational position, in accord with well-established angular position sensing practice.

A degree of depression of an accelerator pedal 18, or equivalent means for communicating a desired engine operating level, away from a rest position is transduced by a trio of pedal position sensors 20, 22, and 24 providing respective output signals PPS1, PPS2, and PPS3 indicating such degree of depression. The sensors 20, 22, and 24 are conventional rotary potentiometers in this embodiment. An electronic throttle module ETM 30 receives the input signals TPS1, TPS2, PPS1, PPS2, ad PPS3, as well as communications from a powertrain control module PCM 26 via a bidirectional communication link 44 through an input/output module I/O 32. The ETM 30 includes such standard microcontroller elements as a central processing unit CPU 34, read only memory ROM 38, and random access memory RAM 36. Through a series of control operations, the input signal information received by the ETM is processed, the processed information passed to the PCM 26 and a throttle position command generated through conventional PCM control operations. The throttle position command is returned to the ETM 30 and is passed from the CPU 34 through the I/O unit 32 to a standard DC motor driver 28, such as a full H-bridge driver configuration. The driver 28 applies drive current to throttle actuator 14 which is a DC brush motor in this embodiment, as described. The drive current excites the actuator to provide for positioning of the actuator and the valve 16 for engine inlet air metering.

Figure 2:
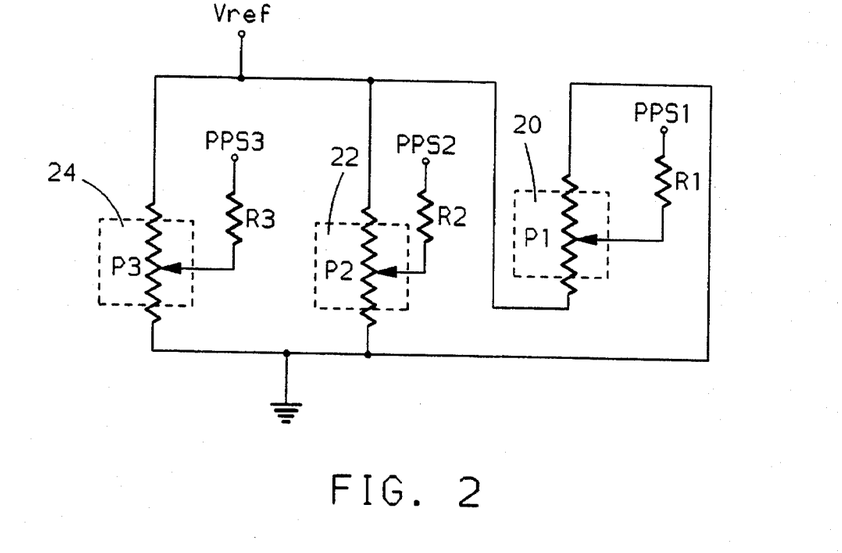
FIG. 2 schematically illustrates the redundant pedal position sensor electrical configuration in accord with the preferred embodiment.

The electrical configuration of the trio of pedal position sensors 20–24 in accord with this embodiment is schematically illustrated in FIG. 2. Potentiometer resistors P1, P2, and P3 are electrically connected between a reference voltage Vref, which is about five volts in this embodiment, and a ground reference voltage. The reference voltage and ground reference voltage are applied across P1 with a polarity which is the reverse of that applied across P2 and P3. The sign of the sensor output signal slope will vary between sensor 20 and the sensors 22 and 24, as will be described.

A voltage reference point varies on potentiometer resistors P1–P3 as the displacement of the accelerator pedal away from a rest position varies. Reference voltage signals PPS1, PPS2 and PPS3 are provided by passing the respective voltage reference points through respective series resistors R1, R2 and R3. The voltage difference between such signals and a reference point, such as the ground reference voltage is used as a displacement measure in this embodiment. Each of resistors R1, R2, and R3, as well as potentiometer resistors P1, P2 and P3 may be assigned distinct resistance values to provide varying sensor-to-sensor slope and offset. The varying slope and offset are valuable for sensor fault detection, as will be described.

Figure 3:
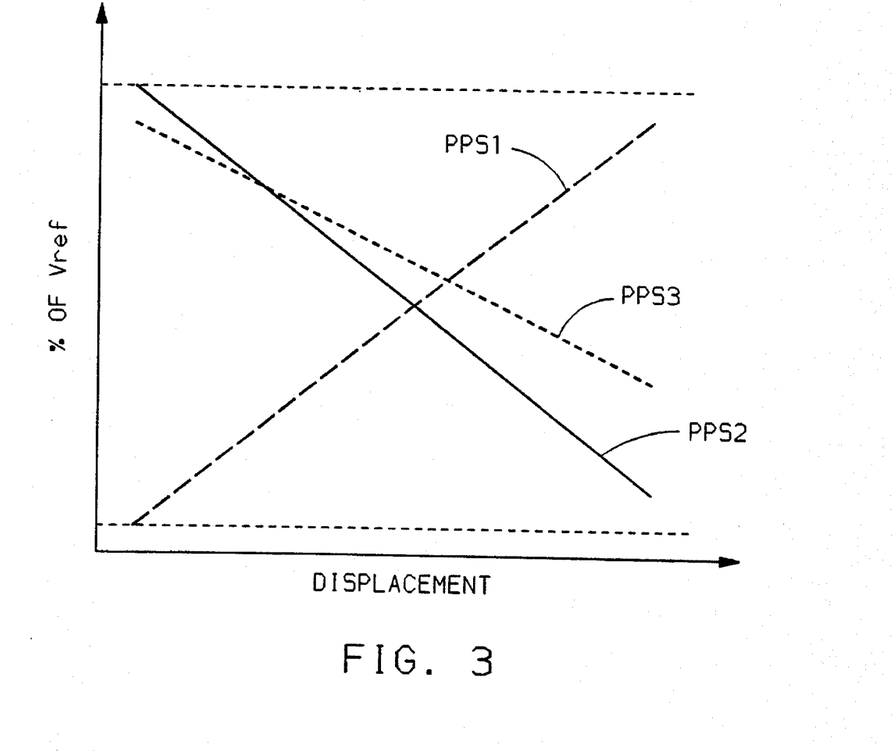
FIG. 3 diagrams relationships between pedal displacement away from a rest position and output signals of the sensors of FIG. 2.

FIG. 3 illustrates a representative set of curves for the trio of sensors 20–24 of this embodiment expressed as a function of pedal displacement. As sensor 20 is configured with a voltage polarity opposing the polarity of sensors 22 and 24 (as illustrated in FIG. 2), the voltage PPS1 corresponding to such sensor 20 will vary with inverse polarity relative to variations in the voltages PPS2 and PPS3 across respective sensors 22 and 24. The slope of the curves of FIG. 3 likewise may vary from sensor to sensor, due to resistance variations between potentiometer resistors P1–P3. Still further, offsets in the curves of FIG. 3, such as are apparent at minimum and maximum pedal displacement positions, may vary from sensor to sensor due to resistance variations between resistors R1–R3 and between potentiometer resistors P1–P3.

The described variations in slope, offset, and polarity provide fault detection advantages in that there is no sensor position for which all three sensors should have a common value. Sensor short circuit conditions to a common voltage value are thus detectable. Short circuit conditions to the ground reference or the Vref are likewise detectable, as minimum and maximum sensor voltage values corresponding to minimum and maximum pedal displacement should never be substantially the same. The rate of change in sensor voltage should also vary between the sensors for a given rate of change in pedal displacement, due to the slope variations illustrated in FIG. 3, providing yet a further fault detection opportunity. When combining the sensor voltages to resolve pedal displacement in accord with this embodiment, the reverse sensor polarity configuration illustrated by FIGS. 2 and 3 will minimize any common increase or decrease in the sensors' output voltage, as such increase or decrease will contribute to the resolved pedal position with a reversed polarity for PPS1 than it will for PPS2 and PPS3. The different resistance values also provide for detection of internal short circuit conditions in the sensors 20–24. Such short circuit conditions will lead to a lack of correlation in sensor output values which may be detected as fault conditions. Other fault detection advantages are available through the configuration of this embodiment, as will be readily recognized through the exercise of ordinary skill in the art.

The series of steps carried out by the ETM 30 (FIG. 1) to provide for the operations of this embodiment may be stored as a series of controller instructions in ROM 38 (FIG. 1) and executed periodically while the ETM 30 is operating, such as while ignition power is applied to the ETM. In this embodiment, ignition power is applied to the ETM 30 when the ignition key of the corresponding automotive vehicle is manually rotated to its "on" position. The series of steps are generally represented by the flow of steps or controller operations detailed in FIGS. 4–7. Other operations that may be ongoing in the ETM 30 in addition to those specifically described in this embodiment, and as generally understood by those with ordinary skill in the art, including periodic reading and processing of the inlet valve position input signals TPS1 and TPS2, reading and processing of cruise control and brake control input signals (not shown), communicating diagnostic information to the PCM 26 or to other modules that may be conventionally included for vehicle diagnostics, receiving inlet air valve position command information from the PCM, verifying the PCM inlet air valve command validity, controlling the actuator 14 in accord with the received position command information, and carrying out self-diagnostic operations.

Figure 4:
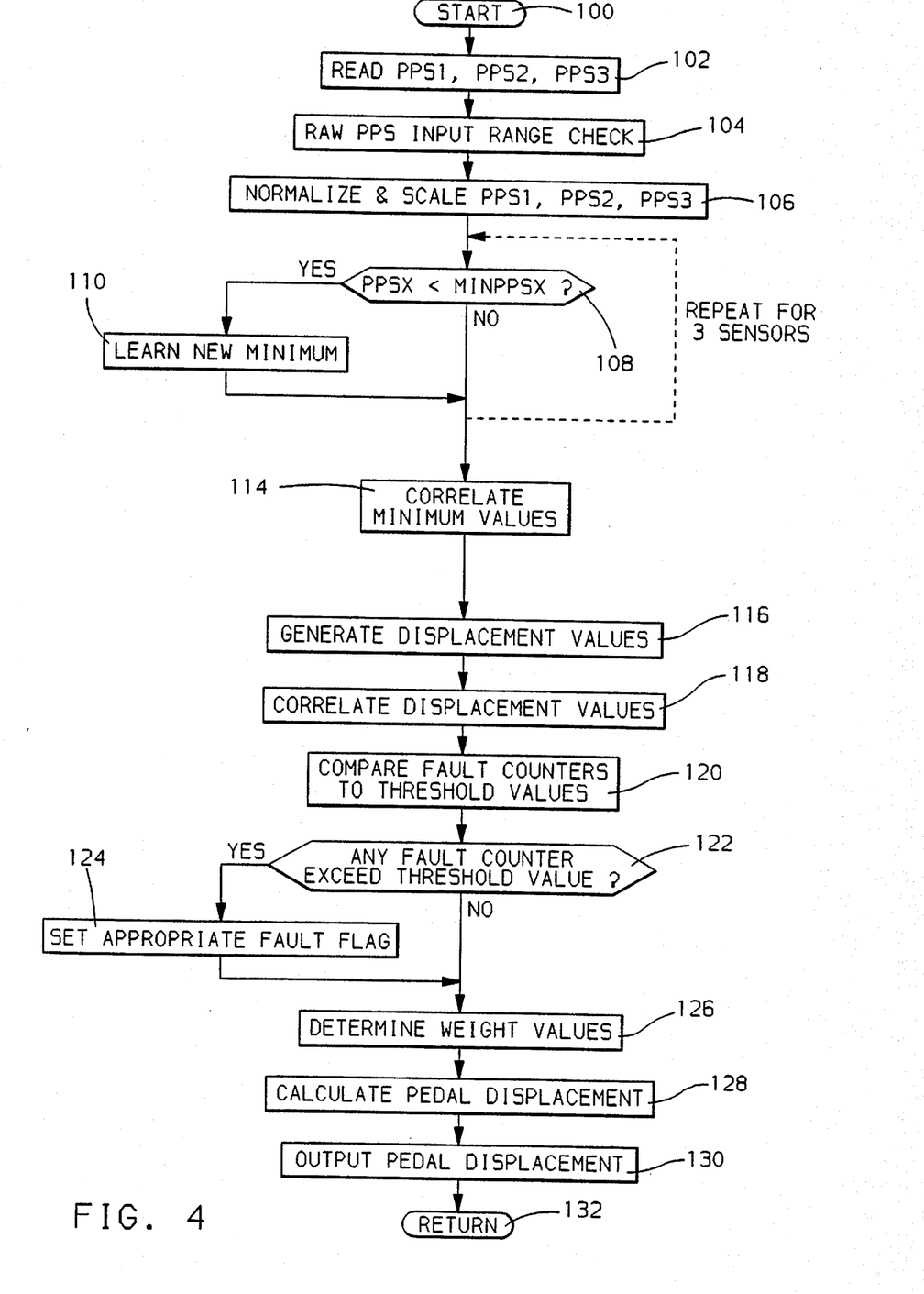
FIGS. 4–7 are diagrams illustrating a flow of control operations of the system of FIG. 1.
Figure 5:
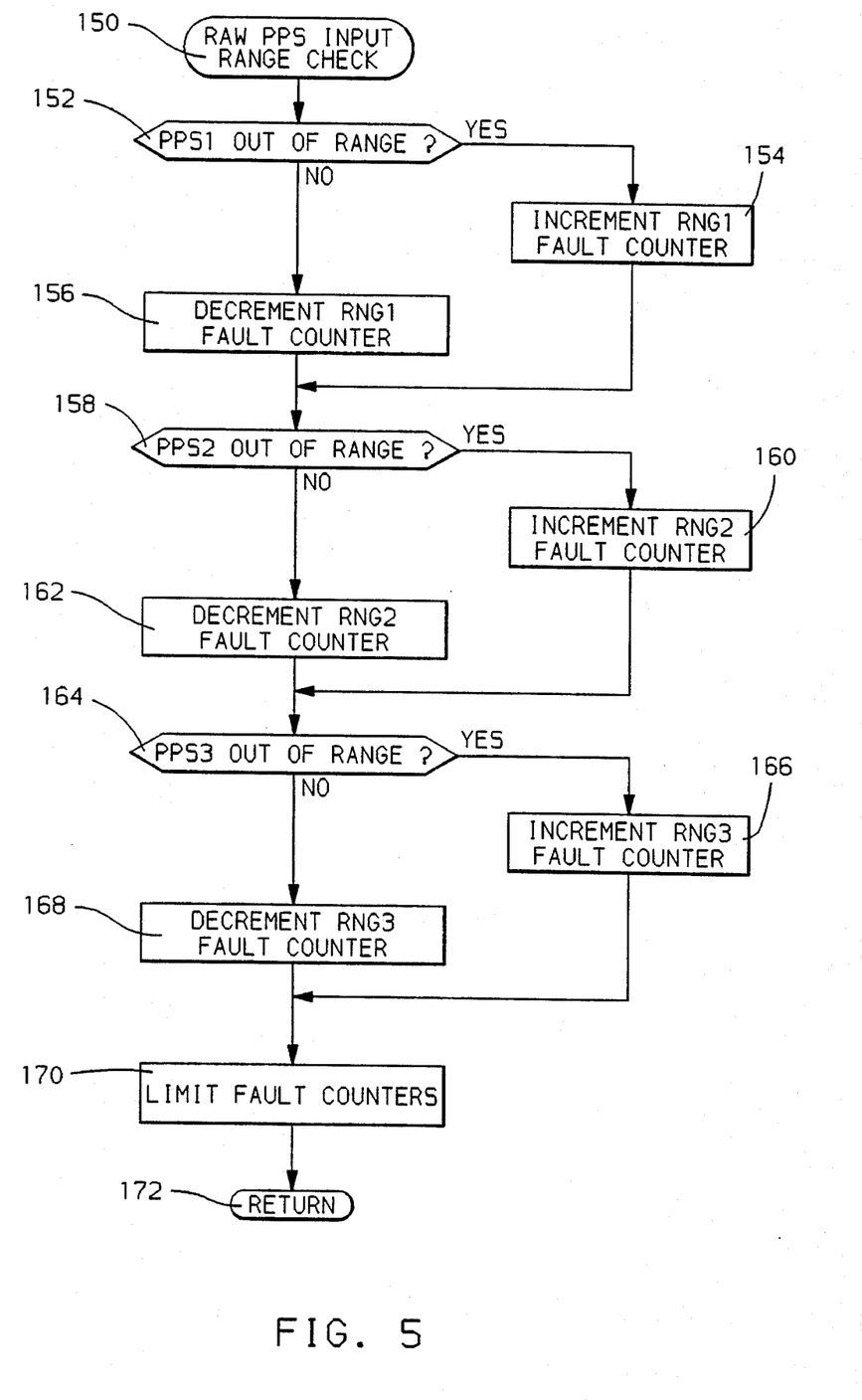

The operations pertaining specifically to pedal displacement signal processing in accord with this embodiment may be executed upon occurrence of a periodic time-based ETM interrupt. When the interrupt occurs, current CPU 34 operations, such as the above-summarized operations, are temporarily suspended, and the CPU executes specific electronic throttle control operations beginning at a step 100 of FIG. 4, and proceeding to a step 102 to read pedal position signals PPS1, PPS2, and PPS3, such as may be provided in the form of analog to digital converter output signals, indicating the voltage drop across the voltage reference points of the trio of potentiometers of FIG. 2. A fault monitoring routine is next executed at a step 104 to determine whether the position signals are within predetermined signal ranges. This routine is illustrated by the sequence of operations of FIG. 5 and, when the step 104 of FIG. 4 is executed, the sequence of FIG. 5 is carried out beginning at a step 150 and proceeding to a step 152 to compare signal PPS1 to a predetermined signal range. The signal range may be established through a conventional calibration process as the expected range of values the PPS1 sensor may output during normal operation. A corresponding range is established in this embodiment for the sensor signals PPS2 and PPS3. If PPS1 is outside the predetermined range at the step 152, a RNG1 fault counter is incremented by a calibrated increment value at a step 154 to record the sensor out of range condition. If PPS1 is not determined to be out of range at the step 152, the RNG1 fault counter is decremented by a calibrated decrement amount am step 156. After either of the steps 154 or 156, the sensor signal PPS2 is examined at a step 158. If PPS2 is outside a predetermined range of sensor values corresponding to normal operation, such as may be determined through a conventional calibration process, a RNG2 fault counter is incremented by a calibrated increment amount at a next step 160. If no such out of range condition is determined at the step 158, the RNG2 fault counter is decremented by a calibrated decrement amount at a next step 162. After either of the steps 160 or 162, the sensor signal PPS3 is analyzed at a next step 164. If PPS3 is outside a range of sensor values corresponding to normal operation, such as may be predetermined through a conventional calibration process, a RNG3 fault counter is incremented by a calibrated increment amount at a next step 166. Otherwise, if PPS3 is not outside the range at the step 164, the RNG3 fault counter is decremented by a calibrated decrement amount at a next step 168. After either of the steps 166 or 168, the routine proceeds to limit the fault counters at a step 170 to preset limits. A low preset limit should be about zero to avoid counter overflow and a high preset limit should be calibrated, through a conventional calibration process, to a value preventing overflows and constraining counter values to reasonable ranges in accord with the specific requirements of system in which the counters are embodied. The range of values between the low and high preset limit values then becomes the working range of the counters and any value exceeding one or the other limit will be set to that limit.

After limiting the fault counters at the step 170, the routine returns, via step 172 to the routine of FIG. 4 to continue execution of such routine at the step 106 at which the pedal position input signals are normalized and scaled to provide for direct signal comparison. For example, conventional scaling and normalization of signals PPS2 and PPS3 is carried out so that PPS2 and PPS3 signals have the same slope and offset as the signal PPS1, so that PPS2 and PPS3 may be directly compared to PPS1 to determine if the three signals generally indicate a common pedal displacement. To provide such normalization and scaling, the PPS2 and PPS3 signal values may be applied to stored lookup tables having calibrated values mapping the input signal values to values on the same scale as the PPS1 signal value.

After normalizing and scaling the pedal position input signals at the step 106, each signal is compared to a corresponding stored minimum signal value at a step 108. If the input signal is less than the corresponding stored minimum value, a step 110 is executed at which a new minimum is learned, such as by applying a conventional first order lag filter to the input signal and the stored minimum, and by limiting the learned minimum to zero. In this manner, variations in the pedal signal corresponding to a minimum pedal displacement may be learned in and used for processing subsequent pedal position signals.

After repeating the steps 108 and 110 for the three pedal position signals, so that each may learn in any new minimum value, a step 114 is next executed to correlate the sensor minimum values. The step 114 is, in this embodiment, a call to the routine illustrated in FIG. 6, to execute the steps of such routine which are responsible for determining if the minimum values of the trio of sensors are substantially the same.

Figure 6:
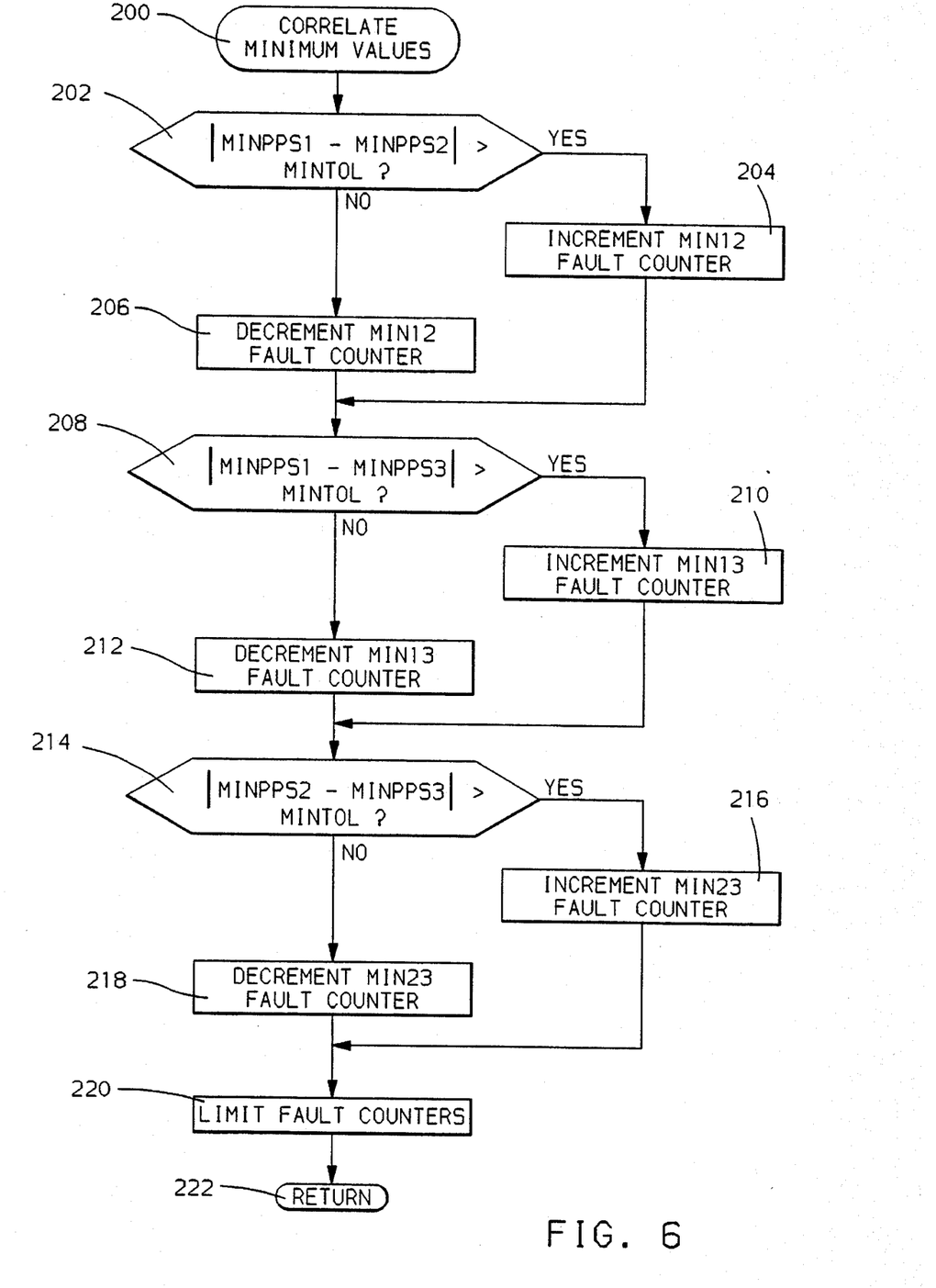

Specifically, the step 114 calls for execution of the routine illustrated by the series of operations of the routine of FIG. 6, beginning at s step 200 and proceeding to a step 202 at which the difference in magnitude between MINPPS1 and MINPPS2 which are, respectively, the minimum values for signals PPS1 and PPS2 as determined at the described step 110, is compared to a calibration constant MINTOL. The constant MINTOL represents a calibrated tolerance for disagreement between sensor minimum values, wherein two pedal position sensor values are allowed to differ by a magnitude of up to MINTOL without a fault condition being assumed. The value MINTOL must be established after an analysis on sensor and analog to digital converter precision for each application, and after considering how much sensor-to-sensor variation will be tolerated in a given application before a fault condition is to be diagnosed.

Returning to the step 202, if the magnitude of difference between MINPPS1 and MINPPS2 exceeds MINTOL, a step 204 is executed to increment a MIN12 fault counter by a calibrated increment value, wherein MIN12 is provided to record such deviations. Alternatively, if the magnitude of the difference does not exceed MINTOL, the MIN12 fault counter is decremented by a calibrated decrement amount at a step 206. After either of the steps 204 or 206, a next step 208 is executed to correlate the minimum values for PPS1 and PPS3. Specifically, the magnitude of the difference between MINPPS1 and MINPPS3, which are the minimum stored sensor values for sensors PPS1 and PPS3, respectively, is compared to MINTOL. If the difference exceeds MINTOL, a MIN13 fault counter is incremented by a calibrated increment amount at a step 210, and if the difference does not exceed MINTOL, the fault counter is decremented by a calibrated decrement amount at a step 212.

After either of the steps 210 or 212, a next step 214 is executed to correlate the minimum stored values for sensors PPS2 and PPS3. Specifically, the difference between MINPPS2 and MINPPS3, which are, respectively, the learned minimum values for sensors PPS2 and PPS3 as determined at the described step 110, are compared to MINTOL and if the difference exceeds MINTOL, a step 216 is executed at which a MIN23 fault counter is incremented by a calibrated increment value. If the difference is not determined to exceed MINTOL at the step 214, a step 218 is next executed at which the MIN23 fault counter is decremented by a calibrated decrement value.

It should be noted that the value MINTOL may vary for each of the sensor pairs correlated through execution of the operations of the routine of FIG. 6. Specifically, MINTOL may take on a calibrated value for the comparison of the step 202 that is different than the MINTOL value for the comparison at the step 208. Further, the MINTO1 used in the comparison at the step 214 may be different than either of the MINTOL values used in the steps 202 and 208. In such case, the different MINTOL values must be established through a conventional calibration process in accord with the considerations described in the text corresponding to the step 202, such as including sensor and analog to digital converter precision and a desired degree of deviation before a fault will be assumed to be present.

After either step 216 or step 218, a next step 220 is executed to limit the MIN12, MIN13, and MIN23 fault counters to a calibrated range of counter values, such to a range defined by about zero at a low counter limit and to a calibrated reasonable upper value at a high counter limit. Such range prevents counter overflows and constrains the counter values to reasonable values in accord with their intended use, to be described. The low and high counter limits define a range of counter values that MIN12, MIN13 and MIN@3 will be constrained to at the step 220, such as by setting the counter value to any limit value that it exceeds or is less than. After limiting the fault counters at the step 220, the correlation of minimum values is complete, and the routine returns, via a next step 222, to the step 114 of the routine of FIG. 4.

After correlating the minimum values through the operations executed at the step 114, a next step 116 is executed to generate displacement values for each of the three sensor input signals. The displacement values in this embodiment represent a count of accelerator pedal displacement away from a rest position and are established as a difference between the normalized, scaled sensor input signals as provided at the step 106 of FIG. 4 and the respective sensor minimum values. The generated displacement values are designated as PPS1D, PPS2D and PPS3D for the respective sensors PPS1, PPS2 and PPS3. The determined displacement values are next correlated at a step 118, which step provides a call to a routine generally illustrated by the flow of operations of FIG. 7. The routine of FIG. 7, when called through execution of the step 118 of FIG. 4, is entered at a step 250, and proceeds to a step 252 to compare a difference between PPS1D, the displacement value corresponding to signal PPS1, and PPS2D, the displacement value corresponding to signal PPS2, to DTOL. The value DTOL is a predetermined value representing a displacement difference tolerance. DTOL may be calibrated after determining the degree of precision and signal repeatability between the pedal position sensors, after examining the precision and repeatability between the analog to digital converters, and after determining how much variation will be tolerated between displacement values before a fault will be diagnosed. If the difference exceeds DTOL at the step 252, a DIS12 fault counter for storing a count of displacement value faults between displacement values corresponding to sensors PPS1 and PPS2 is incremented by a calibrated increment value at a next step 254. If the difference is determined at the step 252 to not exceed DTOL, the DIS12 fault counter is decremented by a calibrated decrement value at a next step 256.

Figure 7:
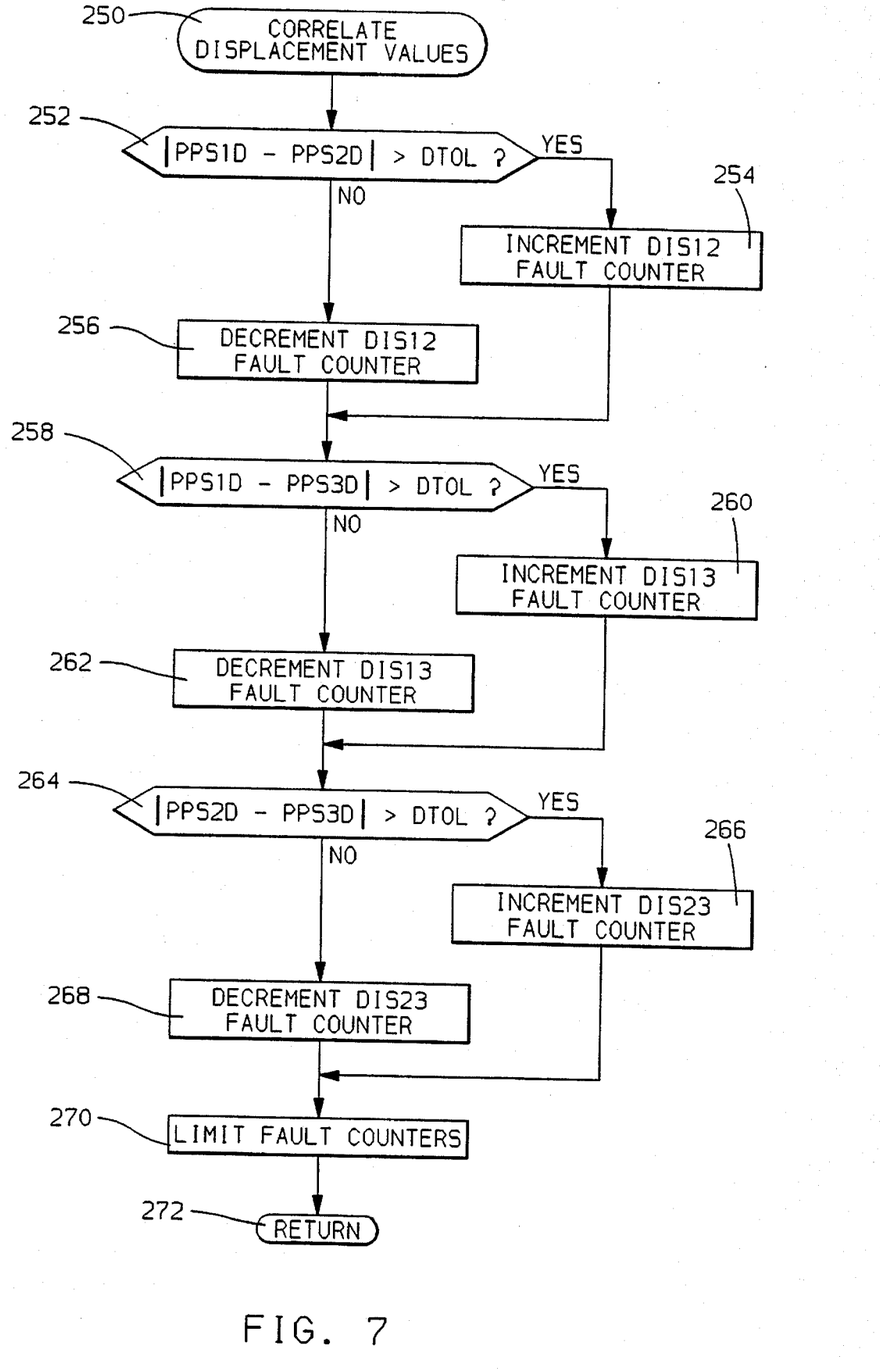

After either of the steps 254 or 256, correlation of displacements values corresponding to PPS1 and PPS3, represented by PPS1D and PPS3D is provided by moving to a next step 258 to compare the magnitude of the difference between PPS1D and PPS3D to a predetermined displacement tolerance value DTOL. DTOL may be calibrated after determining the degree of precision and signal repeatability between the pedal position sensors PPS1 and PPS3, after examining the precision and repeatability between the analog to digital converters corresponding to such sensors PPS1 and PPS3, and after determining how much variation will be tolerated between the corresponding displacement values before a fault will be diagnosed. If the difference exceeds DTOL at the step 258, a DIS13 fault counter for storing a count of displacement value faults between displacement values corresponding to sensors PPS1 and PPS3 is incremented by a calibrated increment value at a next step 260. Returning to the step 258, if the difference is determined to not exceed DTOL, the DIS13 fault counter is decremented by a calibrated decrement value at a next step 262.

After either of the steps 260 or 262, correlation of displacements values corresponding to PPS2 and PPS3, represented by PPS2D and PPS3D is provided by moving to a next step 264 to compare the magnitude of the difference between PPS2D and PPS3D to a predetermined displacement tolerance value DTOL. As described in the text corresponding to the steps 252 and 258, DTOL may be calibrated after determining the degree of precision and signal repeatability between the pedal position sensors PPS2 and PPS3, after examining the precision and repeatability between the analog to digital converters corresponding to such sensors PPS2 and PPS3, and after determining how much variation will be tolerated between the corresponding displacement values before a fault will be diagnosed. If the difference exceeds DTOL at the step 264, a DIS23 fault counter for storing a count of displacement value faults between displacement values corresponding to sensors PPS2 and PPS3 is incremented by a calibrated increment value at a next step 266. Returning to the step 264, if the difference is determined to not exceed DTOL, the DIS23 fault counter is decremented by a calibrated decrement value at a next step 268. It should be pointed out that the value DTOL may vary for each of the three operations of steps 252, 258, and 264, so that varying tolerances may be made available for each of the three correlations provided through the operations of FIG. 7. The individual DTOL values may be calibrated for each of the pair of sensors correlated at the steps 252, 258, and 264, in accord with the desired degree of magnitude correlation between each corresponding sensor pair.

After either of the steps 266 or 268, the displacement fault counters are limited at a next step 270 to a range of fault counter values calibrated to prevent counter overflows and to ensure that counter values are of appropriate magnitude for use in accord with this embodiment. The calibrated counter limits are compared to the counter values at the step 270 and if a counter value exceeds either of its limit values, it is set to that limit value at the step 270.

After limiting the fault counters at the step 270, a next step 272 is executed to return to the operations of FIG. 4 at the step 118, as correlation of the displacement values is complete. Following execution of the step 118, a next step 120 is executed to compare the fault counters established through execution of the routines of FIGS. 5–7 to a corresponding set of counter threshold values. The threshold values are calibrated through a conventional calibration process to maximum values tolerated for each corresponding counter before a fault condition will be flagged. Occasional small count values may be tolerated without flagging a fault condition, but when the counter values increase to a level indicating a persistent out of range condition or a persistent condition of sensor-to-sensor disagreement, such that they exceed a corresponding calibrated threshold value, a fault should be flagged.

Returning to the step 120 of FIG. 4, if any of the fault counters exceeds its corresponding threshold values as determined at a next step 122, a fault flag is set at a next step 124. The fault flag may be stored in ETM memory, such as in a non-volatile portion of RAM 36 (FIG. 1). After setting any fault flags at the step 124, or if no fault counters exceeded their corresponding threshold values at the step 122, weight values are next determined at a step 126 for weighting the trio of displacement values in accord with the fault status of the corresponding sensor. Each sensor has one weight value which may take the form of a multiplicitive coefficient applied to the displacement value corresponding to the sensor. The displacement value corresponding to PPS1, called PPS1D in this embodiment, has a weighting value W1, the displacement value corresponding to PPS2, called PPS2D in this embodiment, has a weighting value W2, and the displacement value corresponding to PPS3, called PPS3D in this embodiment, has a weighting value W3. The weighting values are determined in this embodiment as a function of the current fault flag values that may have been set at the described step 124, or which may not be set. Fault flags are initialized to zero during each ETM operating cycle in this embodiment and remain at zero unless set at the described step 124.

The weighting values are to be calibrated in this embodiment and stored in the form of a lookup table of values referenced by the status of all of the fault flags for the trio of sensors. The weighting values provide that a sensor will have a greater input into a resolved pedal position used in electronic throttle control if it is characterized by fewer flagged fault conditions (if fewer diagnosed fault conditions are attributed to the sensor). If the fault flags indicate that a single sensor has a significant number of flagged fault conditions, or has at least one severe fault condition, it may substantially be excluded from the position resolution process, as will be described. A severe fault condition is a fault condition commonly associated with a substantial degradation in sensor accuracy, such as a condition in which a sensor signal is found to be outside a reasonable signal range, as is diagnosed through execution of the operations corresponding to FIG. 5. Likewise, if a sensor has few associated faults, it will have a more significant contribution to resolving pedal position.

The following logic statements are examples of fault flags and corresponding weighting values in accord with this embodiment, in which the term "fcf" is "fault counter flag".

EXAMPLE 1:

IF: all fcf clear, THEN: $W1=W2=W3=\frac{1}{3}$.

EXAMPLE 2:

IF: all fcf set, THEN: $W1=W2=W3=0$.

EXAMPLE 3:

IF: RNG1 fcf set and
   RNG2 fcf clear and
   RNG3 fcf clear and
   MIN23 fcf or DIS23 fcf not set,
THEN: for any MIN12, MIN13, DIS12 and DIS13 fcf, $W1=0, W2=W3=\frac{1}{2}$.

EXAMPLE 4:

IF: RNG1 fcf set and
   RNG2 fcf set and
   RNG3 fcf clear and
THEN: for any combination of MINxx and DISxx fcf, $W1=W2=0, W3=1$.

EXAMPLE 5:

IF: RNG1 fcf set and
   RNG2 fcf set and
   RNG3 fcf set and
THEN: for any MINxx and DISxx, $W1=W2=W3=0$.

The principles under which the above examples are established are described, for purposes of enabling extension of this logic to cover all possible fault flag scenarios, as follows. If, as in example 1, no fault conditions are flagged, each sensor has an equal one third contribution (weighting) to the pedal displacement indication. If, as in example 2, all fault conditions are flagged or, as in example 5, all sensors are out of range, each sensor weight will be zero, resulting in an indication of zero pedal displacement, due to an assumed severe pedal sensing fault condition.

If, as in example 4, only one of the trio of sensors is in range such that it has a clear RNGx flag, then for any combination of sensor correlation fault flags, it will have a weight of one and the other two sensors will have a weight of zero, excluding such other two sensors from contributing to the displacement determination. If, as in example 3, two sensors are within range indicated by two RNGx flags being clear, and the two that are within range correlate with each other, then the two correlating sensors will have a weight of ½ and the third sensor will have a weight of zero. Finally, if any combination of flags does not provide a clear indication of a "more faulty" sensor between any pair of two sensors having some flagged fault condition, the sensor with the lower indicated pedal displacement value will have a weight of one and the other two sensors will have a weight of zero.

These examples illustrate that correlation fault conditions are not relatively severe due, for example, to tolerances between sensors and between electronic components. Out of range fault conditions however, are severe. Increases in non-severe fault conditions for a sensor result in a more gradual reduction in weight values and thus in sensor contribution to displacement resolution, whereas severe fault conditions result in a more rapid reduction in the weight values.

It is to be understood that this invention is not to be limited to the specific method of weighting value determination described above for the step 126 of FIG. 1. Rather, the inventors intend that any method of varying the degree of contribution of each of a plurality of "redundant" sensors, such as the trio of sensors of this embodiment, whether gradually or more rapidly, as a function of sensor fault conditions, to the resolution of a sensed value is within the scope of this invention. For example, substantially continuous functions may be provided for each of the weighting values having fault flags or indeed fault counters as function inputs, subject to the condition that the sum of the weighting values equals one or, in the case of a severe fault condition, equals zero. Such functions may be generally expressed as $$Wx=F(\text{MINxx fault counter, DISxx fault counter, RNGx fault counter})$$

wherein x takes on values from 1 to 3 to cover the three weighting values and the nine different fault counter values. It should be further understood that certain values, such as counter values or weight values may be stored in non-volatile portions of ETM RAM 36 (FIG. 1) so that important sensor diagnostic information may be retained for use from one ignition cycle to the next, rather than waiting to "relearn" such information in a subsequent ignition cycle.

Returning to the routine of FIG. 4, after determining the weight values at the step 126, a pedal displacement value PD is resolved through the following calculation:

$$PD=W1*PPS1D+W2*PPS2D+W3*PPS3D$$

so that a final resolved pedal position includes information from each of the redundant sensors with a multiplicitive weight coefficient established in accord with the determined integrity of the corresponding sensor value. Sensor values more likely to be faulty, due to a plurality of related fault conditions, will contribute less to the PD determination than will sensor values appearing less likely to be faulty, in accord with a critical aspect of this invention.

The pedal displacement value PD is next output at a step 130 to the PCM 26 (FIG. 1) via the ETM I/O hardware 32 for use in establishing a desired engine inlet air valve position in accord with well-established and generally understood principles of electronic throttle control. After outputting the pedal displacement value at the step 130, a step 132 is executed to return to any prior operations that were temporarily suspended to allow for servicing the interrupt through execution of the routines of FIGS. 4–7.

The preferred embodiment for the purpose of explaining this invention is not to be taken as limiting or restricting this invention since many modifications may be made through the exercise of ordinary skill in the art without departing from the scope of this invention.

The embodiments of the invention in which a property or privilege is claimed are described as follows:

1. A method for determining displacement of a movable part, comprising the steps of:

for each of a plurality of displacement transducers, (a) providing a displacement signal from the displacement transducer, (b) diagnosing fault conditions in the displacement transducer, (c) establishing a fault severity value indicating a degree of severity of any diagnosed fault condition, and (d) calculating an adjusted displacement signal as a predetermined function of the provided displacement signal and the fault severity value; and determining displacement of the movable part by combining the adjusted displacement signals for the plurality of displacement transducers.

2. The method of claim 1, further comprising, for each of the plurality of displacement transducers, the step of:

diagnosing whether a severe fault condition is present for the displacement transducer;

wherein the establishing step establishes a fault severity value that gradually increases in magnitude from an initial value toward a limit value as the number of fault conditions diagnosed to be present increases and that is set to the limit value when a severe fault condition is diagnosed to be present, and wherein the predetermined function provides for a relationship of substantially inverse proportionality between the adjusted displacement signal magnitude and the fault severity value magnitude.

3. The method of claim 2 wherein, for any of the plurality of displacement transducers for which no severe fault condition is diagnosed to be present, the fault severity values are established subject to the condition that the sum of all of such values is substantially equal to a predetermined constant.

4. The method of claim 1, further comprising, for each of the plurality of displacement transducers, the steps of:

comparing the displacement signal to the displacement signals provided by the other of the plurality of displacement transducers; and determining a correlation fault condition when the displacement signal does not substantially correspond to the displacement signals of the other of the plurality of displacement transducers; and wherein the fault conditions diagnosed at the diagnosing step include the correlation fault condition.

5. The method of claim 1, further comprising, for each of the plurality of displacement transducers, the steps of:

establishing a range of displacement signal values over which the displacement signal of the corresponding displacement transducer may normally vary;

comparing the displacement signal provided by the corresponding displacement transducer to the established range; and determining an out of range fault condition when the displacement signal exceeds the established range; and wherein the fault conditions diagnosed at the diagnosing step include the out of range fault condition.

6. The method of claim 1, further comprising the steps of:

establishing, for each of the displacement transducers, a minimum displacement signal corresponding to a minimum displacement;

comparing the minimum displacement signals of the plurality of displacement transducers; and determining a minimum correlation fault condition for any of the plurality of transducers having a minimum displacement signal that does not substantially correspond to the minimum displacement signals of the other of the plurality of displacement transducers; and wherein the fault conditions diagnosed at the diagnosing step include the minimum correlation fault condition.

7. A method for resolving displacement from a plurality of displacement input signals provided by a plurality of redundant displacement sensors, comprising the steps of:

diagnosing whether any of a predetermined set of displacement sensor fault conditions are present;

attributing each fault condition diagnosed to be present to at least one of the displacement sensors;

for each displacement input signal, determining a signal weight value as a predetermined function of the fault conditions attributed to the corresponding sensor;

applying each determined signal weight value to the corresponding displacement input signal to form a weighted input signal; and combining the weighted input signals to form a resolved displacement value.

8. The method of claim 7, wherein the predetermined set of displacement sensor fault conditions includes a predetermined subset of severe displacement sensor fault conditions, and wherein the determining step further comprises the step of:

for each of the plurality of displacement sensors, setting the corresponding signal weight value to a minimum weight value if any severe fault conditions that are diagnosed to be present are attributed to the corresponding sensor.

9. The method of claim 8 wherein, for each sensor to which no severe fault conditions are attributed, the predetermined function yields signal weight values that vary inversely with the number of diagnosed fault conditions attributed to the corresponding sensor.

10. The method of claim 9, wherein the predetermined function is subject to the condition that the sum of the signal weight values for the sensors to which no severe fault conditions are attributed is a predetermined constant.

11. The method of claim 10, further comprising the steps of:

establishing a signal range over which displacement input signals may vary under normal operating conditions;

comparing the displacement input signals to the established signal range;

and wherein the diagnosing step diagnoses a severe fault condition to be present when a displacement input signal exceeds the established signal range.

12. The method of claim 10, further comprising the steps of:

for each of the plurality of displacement sensors, establishing a signal range over which the corresponding displacement input signal may vary under normal operating conditions;

comparing each displacement input signal to its corresponding established signal range;

and wherein the diagnosing step diagnoses a severe fault condition to be present when a displacement input signal exceeds the corresponding established signal range.

* * * * *